Nov. 10, 1931.  J. W. LIVINGSTON  1,831,458
APPARATUS FOR MEASURING TIME INTERVALS
Filed July 29, 1930   2 Sheets-Sheet 1

INVENTOR:
J. W. Livingston,
by A. K. Vencill
His Attorney

Nov. 10, 1931.   J. W. LIVINGSTON   1,831,458
APPARATUS FOR MEASURING TIME INTERVALS
Filed July 29, 1930   2 Sheets-Sheet 2

INVENTOR:
J. W. Livingston
by A. L. Vincill
His Attorney

Patented Nov. 10, 1931

1,831,458

UNITED STATES PATENT OFFICE

JOHN WARNER LIVINGSTON, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

APPARATUS FOR MEASURING TIME INTERVALS

Application filed July 29, 1930. Serial No. 471,523.

My invention relates to apparatus for measuring time intervals, and has for an object the provision of novel and improved means for measuring and recording the interval of time between the beginning and the end of an event or the interval between consecutive events.

I will describe one form of apparatus embodying my invention, and will then point out the novel features thereof in claims.

Figure 1:
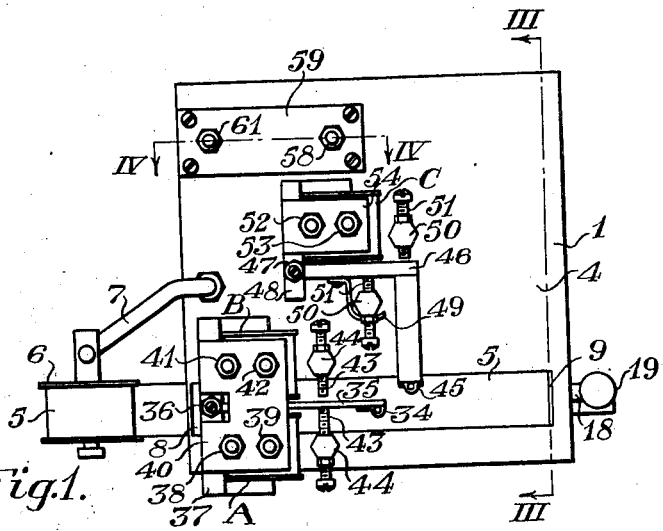
Figure 2:
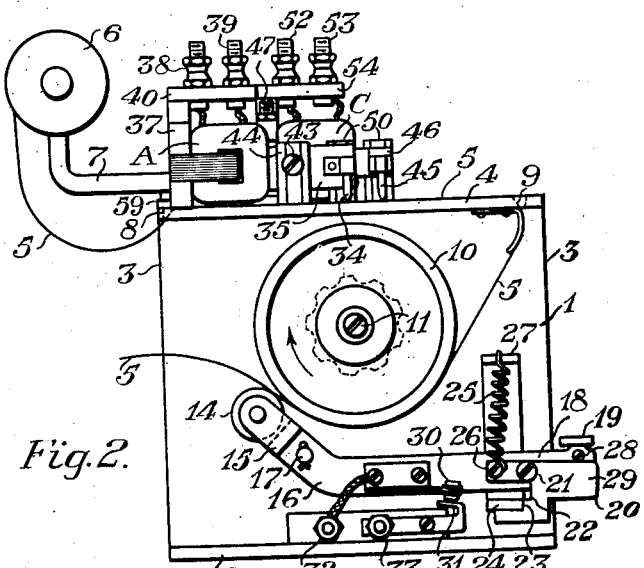
Figure 4:
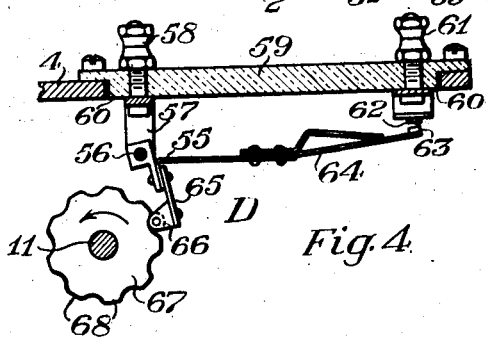
Figure 3:
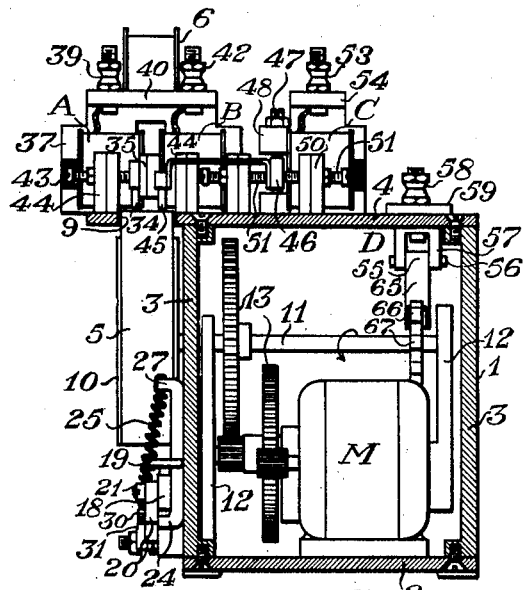
Figure 5:
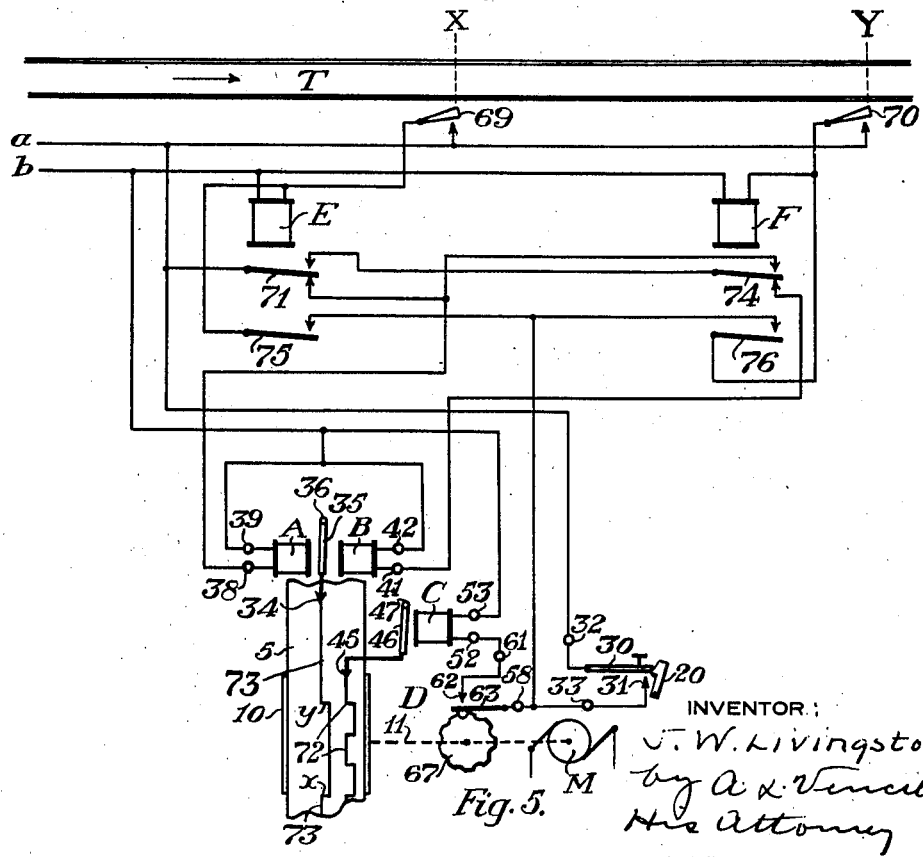

In the accompanying drawings, Fig. 1 is a plan view of one form of apparatus constructed in accordance with my invention. Fig. 2 is a side elevational view of the apparatus shown in Fig. 1. Fig. 3 is a vertical sectional view taken on line III—III of Fig. 1. Fig. 4 is an enlarged fragmentary vertical sectional view taken on line IV—IV of Fig. 1 and showing more in detail a contact device which controls the operation of a detector stylus. Fig. 5 is a view, partly diagrammatic, showing another form of apparatus which includes the apparatus shown in Figs. 1, 2, 3 and 4.

Similar reference characters refer to similar parts in each of the several views.

Referring to the drawings, an apparatus constructed in accordance with my invention is shown as comprising a housing 1 having a base 2, side walls 3 and a top 4, one edge of which overhangs one of the side walls and constitutes a support or platen for a movable record strip 5. This strip is wound upon a reel 6 which is mounted for free rotation upon a bracket 7, carried by the top 4 and extends downwardly and thence upwardly through an opening 8 formed in the top 4, thence over the top and downwardly through another opening 9 formed therein, and thence beneath a drum 10. The drum 10 is fixed to the outer end of a main drive shaft 11, which is journalled in brackets 12 (Fig. 3) located within housing 1 and is rotated at a predetermined speed by a constant speed electric motor M also located within the housing through the medium of a suitable reduction gearing 13.

During the operation of the apparatus, the record strip 5 is maintained in frictional engagement with the drum 10 by a pinch roller 14 (Fig. 2), which is mounted on an arm 15 of a lever 16. This lever is pivotally mounted intermediate its ends on the side wall of the housing, as at 17, and the other arm 18 thereof is provided with a button or finger rest 19 by means of which the lever may be swung about its pivot in order to carry the pinch roller 14 into operative engagement with the strip 5. A latch lever 20 is pivotally mounted intermediate its ends on the side of the arm 18 of the lever 16 as at 21, and is provided with a pair of superimposed notches or stepped shoulders 22 and 23, for engagement with a lug 24 fixed to the side wall of the housing 1. The lever 16 is urged about its pivot 17 in a counter-clockwise direction to maintain the pinch roller 14 in an ineffective position when the apparatus is not in use, and the latch lever 20 is urged about its pivot 21 to maintain one or the other of the notches 22 and 23 in engagement with the lug 24 by means of a coiled spring 25. The lower end of this spring is secured to an arm 26 of the latch lever 20 and the upper end thereof is fixed to a bracket 27 carried by the side wall of the housing 1. A stop 28 is provided on the arm 18 of the lever 16 for engagement by the other arm 29 of the latch lever 20 in order to limit the pivotal movement of this lever against the action of the spring 25.

When the arm 18 of the lever 16 is depressed in order to carry the pinch roller 14 into engagement with the strip 5 to effect driving contact between the strip and the drum 10, the upper notch 22 in the latch lever 20 engages the lug 24 under the action of the spring 25 and maintains the lever 16 and roller 14 in the position to which they are moved. When, however, the latch lever 20 is swung in a counter-clockwise direction in order to release the notch 22 from engagement with the lug 24, in moving the pinch roller 14 to an ineffective position, the lower notch 23 engages the lug 24 and limits the upward movement of the lever 16 under the action of the spring 25 beyond a point where driving contact between the drum and strip is interrupted.

A spring contact 30 is also mounted on the side of the arm 18 of the lever 16 for engagement with a fixed contact 31 mounted on the side wall of the housing 1 when the lever is actuated to move the pinch roller 14 into operative engagement with the strip 5. The contacts 30 and 31 are provided with terminal posts 32 and 33, respectively, for connection in a circuit hereinafter to be described in connection with the operation of the apparatus.

Cooperating with the strip 5 is a recording stylus 34 which may be of any preferred type such as a pen or pencil or an instrument adapted to puncture, cut or otherwise deform the strip. This stylus is carried by an armature 35, which is pivotally mounted at one end, as at 36, (Fig. 1) on a bracket 37 and carried by the top 4 of the housing 1. Electromagnets A and B hereinafter referred to as the first and second electromagnets, respectively, are supported by the bracket 37, one on each side of the armature 35. The winding of the first electromagnet A is connected to terminal posts 38 and 39 carried by a terminal board 40 supported by the bracket 37 and the winding of the second electromagnet B is connected with binding posts 41 and 42, also carried by the terminal board 40. The electromagnets A and B are adapted to be alternately energized, as will be described presently, and the parts are so arranged that when these electromagnets become thus energized, the stylus 34 will be moved in a direction transverse to that of the movement of the strip 5 according to which of the electromagnets is energized. The lateral movement of the stylus 34 may be regulated by adjustment screws 43, which are threaded into posts 44 carried by the top 4 on opposite sides of the armature 35 for engagement thereby.

When the circuit for one of the electromagnets is closed, the stylus 34 will move in one direction and record this fact by suitable indicia produced on the strip 5 and when the circuit for the other electromagnet is closed, the stylus will move in an opposite direction and record this fact upon the record strip. Thus, if the strip is moving at a predetermined rate of speed, the time elapsing between the closing of these two circuits may be determined from the distance between the recorded movements of the stylus on the strip 5.

Also cooperating with the strip 5 is a detector stylus 45 of any preferred type. This stylus is carried by an armature 46 which is pivotally mounted as at 47 (Fig. 1) on a bracket 48 carried by the top 4. A spring 49 is secured to the end of the armature 46 for engagement with one of the posts 50 carried by the top 4 and tends to yieldably hold the armature 46 in engagement with one of a pair of adjusting screws 51 which are threaded into the posts 50. The armature 46 is swung about its pivot 47 against the action of the spring 49 in order to move the stylus 45 transversely of the strip 5 by a third electromagnet C, which is supported by the bracket 48. The winding of this electromagnet is connected with terminal posts 52 and 53 which are carried by a terminal board 54 also supported by the bracket 48.

The energization of the third electromagnet C is controlled in part by a make and break contact device D shown in detail in Fig. 4. This contact device comprises a bell crank lever 55 which is pivotally mounted, as at 56, to a bracket 57 secured by a terminal post 58 to the underside of a plate 59 of insulating material. This plate is mounted in an opening 60 formed in the top 4 and carries a terminal post 61 to which a fixed contact element 62 is secured for engagement by a spring contact finger 63 carried by a horizontal extending arm 64 of the bell crank lever 55. The other arm 65 of the lever 55 extends downwardly and carries a roller 66 for engagement with a cam 67 fixed to the main drive shaft 11. The periphery of the cam 67 is formed with a plurality of equi-distant spaced cam lobes 68 which successively engage the roller 66 and cause the spring finger 63 to periodically move into engagement with the contact 62. This causes the electromagnet C to be periodically energized and deenergized in timed relation with the rotation of the main drive shaft 11 and drum 10, and causes the detector stylus 45 to oscillate and record its movements on the strip 5. If there is no slippage between the strip 5 and the drum 10, the detector stylus 45 will record a series of uniformly spaced indications thereon and the indicia recorded by the recording stylus 34 may then be relied upon as accurate, but if certain of the indicia recorded by the detector stylus 45 are not uniformly spaced, this fact will indicate that the strip 5 has slipped relative to the drum 10 and that the indicia recorded by the recording stylus 34 are incorrect.

As an example of one application of my invention for measuring time intervals and for determining whether or not such measurements are correct, I will assume that the apparatus shown in Figs. 1, 2, 3 and 4, is connected in a circuit such as that shown in Fig. 5 and that it is desired to ascertain the time required for a car moving over a track T to cover the distance between the points indicated by the broken lines X and Y in Fig. 5. In this particular application, I employ a first control relay E controlled by a first train-operated normally open contact device 69 located adjacent the track T at the point X, and a second control relay F controlled by a second train-operated normally open contact device 70 located adjacent the track T at the point Y.

With the apparatus connected as shown in Fig. 5, the first electromagnet A is energized by electric current which traverses a circuit passing from terminal $a$ of a source of electric energy, through back contact 71 of first control relay E, terminal post 38, winding of the first electromagnet A and terminal post 39, to terminal $b$ of the same source of current. This causes the recording stylus 34 to assume the left-hand position shown in Fig. 5.

I will next assume that an operator closes an electric circuit, not shown in the drawings, causing the motor M to rotate the drum 10 in the direction indicated by the arrow in Fig. 2, but inasmuch as the pinch roller 14 occupies its ineffective position at this time, no motion is transmitted to the recording strip 5. The motor also now rotates cam 67 which causes contact 62—63 of device D to alternately close and open.

I will further assume that an eastbound car is proceeding over the track T in the direction indicated by the arrow in Fig. 5. The operator therefore depresses the lever 16 until the pinch roller 14 forces the strip 5 into frictional engagement with the rotating drum 10 at which point the upper notch 22 engages the lug 24 and maintains the lever 16 in this position. The downward movement of the lever 16 also closes the contact 30—31 which establishes a circuit passing from terminal $a$, through terminal post 32, contact 30—31, terminal posts 33 and 58, contact 62—63 of the make and break contact device D, terminal posts 61 and 52, winding of the third electromagnet C and terminal post 53 to terminal $b$. As has been previously stated, the rotation of the cam 67 causes the contact 62—63 to close and open in timed relation with the operation of the motor M and the drum 10 driven thereby, and consequently, the electromagnet C will be correspondingly energized and deenergized. This causes the detector stylus 45 to oscillate and to produce indicia on the now moving record strip 5 at regular spaced intervals as indicated by the lines 72 in Fig. 5. During this time the recording stylus 34 has been producing a straight line on the strip 5 as indicated at 73 in Fig. 5.

As soon, however, as the car reaches the point X it closes the contact device 69, thereby energizing the first control relay E by virtue of a pick-up circuit passing from terminal $a$, through contact device 69, and winding of relay E to terminal $b$. This opens back contact 71 of relay E and the circuit previously traced through this contact which maintains the first electromagnet A energized. The energization of relay E also closes front contact 71 of this relay and establishes a circuit passing from terminal $a$, through front contact 71 of relay E, back contact 74 of second control relay F, terminal post 41, winding of the second electromagnet B, and terminal post 42 to terminal $b$. The second electromagnet B is thus energized and moves the recording stylus 34 to the right, as viewed in Fig. 5, thereby producing a transverse mark $x$ on the record strip 5 indicative of the closing of the contact device 69. The energization of the first control relay E also closes front contact 75 of this relay which establishes a stick circuit for relay E passing from terminal $a$, through terminal post 32, contact 30—31, terminal post 33, front contact 75 of relay E, and winding of this relay to terminal $b$. This stick circuit maintains the relay E energized which, by its front contact 71, maintains the energizing circuit for the second electromagnet B closed after the car has passed the point X and has permitted the contact device 69 to open.

As soon as the car reaches the point Y it closes the contact device 70, thereby causing the energization of the second control relay F by virtue of a pick-up circuit passing from terminal $a$, through contact device 70 and winding of relay F to terminal $b$. The energization of control relay F opens its back contact 74, thereby interrupting the circuit previously traced through this contact which maintains the second electromagnet B energized, and then closes a front contact 74 of this relay. The closing of front contact 74 causes the reenergization of the first electromagnet A by virtue of a circuit passing from terminal $a$, through front contact 71 of first control relay E, front contact 74 of second control relay F, terminal post 38, winding of electromagnet A, and terminal post 39 to terminal $b$. The energization of second control relay F also closes a front contact 76 of this relay which establishes a stick circuit for relay F passing from terminal $a$, through terminal post 32, contact 30—31, terminal post 33, front contact 76 of relay F, and winding of this relay to terminal $b$. This stick circuit maintains the relay F energized which by its front contact 74, holds the circuit previously traced for the electromagnet A through front contact 74 intact after the car has passed point Y and allowed the contact device 70 to open.

The reenergization of the first electromagnet A, as above described, causes the recording stylus 34 to shift to the left, as viewed in Fig. 5, and make a transverse mark $y$ on the record strip 5 indicative of the fact that the car has reached point Y and closed the contact device 70. Now, inasmuch as the speed of the record strip 5 is known, the time required for the car to travel from the point X to the point Y can be determined readily from the measured distance between the marks $x$ and $y$ recorded on the strip 5. Also, inasmuch as the operation of the detector stylus 45 is uniform, any irregularities in the spacing of the marks 72 made by this stylus on the strip 5 are indicative of the fact that the strip 5 has slipped on the drum 10 and that the distance $x$—$y$ recorded by the stylus 34 is not a correct record. In such event the test is repeated until the detector stylus 45 produces a series of uniformly spaced marks on the strip 5. When a record is thus obtained, it may be relied upon as being accurate to within a relatively small fraction of a second.

At the conclusion of the test, the operator releases the latch lever 20 from engagement with the lug 24, thereby permitting the lever 16 to swing about its pivot 17 in a counter-clockwise direction under the action of the spring 25. This movement of the lever 16 not only swings the pinch roller 14 to an ineffective position, thereby discontinuing the movement of the record strip 5, but also opens the contact 30—31, thereby not only interrupting the stick circuits for the control relays E and F, but also opening the energizing circuit for the electromagnet C previously traced through this contact, thus restoring the apparatus to its initial condition.

My invention, herein shown and described, comprises very simple and efficient apparatus for recording means for determining the duration of a time interval. Errors due to slippage between the record strip 5 and its driving means, or due to any other cause, may be readily detected and corrected.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In apparatus for measuring a time interval comprising a movable record receiving element, driving means operating at a predetermined speed for frictionally moving said element, and a device for producing distinctive indicia upon said element indicating the beginning and end of said interval, whereby the distance between said distinctive indicia is a measure of the length of said interval; the combination with the aforementioned instrumentalities, of a second device for producing distinctive indicia upon said element, and means actuated by said driving means for controlling the operation of said second device, whereby the indicia recorded on said element by said second device indicate equal measured units of movement of said driving means and the relation of such movement to the movement of said element.

2. In apparatus for measuring a time interval comprising a movable record receiving element, driving means operating at a predetermined speed for fractionally moving said element, and a device for producing distinctive indicia upon said element indicating the beginning and end of said interval, whereby the distance between said distinctive indicia is a measure of the length of said interval; the combination with the aforementioned instrumentalities, of a stylus for producing distinctive indicia upon said element, an electromagnet for operating said stylus, and means actuated by said driving means for controlling the energization of said electromagnet, whereby the indicia recorded on said element by said stylus indicate equal measured units of movement of said driving means and the relation of such movement to the movement of said element.

3. In apparatus for measuring a time interval comprising a movable record receiving element, driving means operating at a predetermined speed for frictionally moving said element, and a device for producing distinctive indicia upon said element indicating the beginning and end of said interval, whereby the distance between said distinctive indicia is a measure of the length of said interval; the combination with the aforementioned instrumentalities, of a stylus for producing distinctive indicia upon said element, an electromagnet for operating said stylus, a contact device for controlling the energization of said electromagnet, and a cam actuated by said driving means for periodically operating said contact device, whereby the indicia recorded on said element by said stylus indicate equal measured units of movement of said driving means and the relation of such movement to the movement of said element.

4. Apparatus for measuring a time interval comprising a movable record receiving element, driving means for moving said element, a first electromagnetic means operating when energized to make a distinctive record on said element, a second electromagnetic means operating when energized to make a different distinctive record on said element, a first control relay for causing the energization of said first electromagnetic means, a second control relay for causing the energization of said second electromagnetic means, a manually controlled device, a pick-up circuit for said first control relay arranged to be closed at the beginning of said time interval, means controlled by said device for subsequently holding said first control relay in its energized condition, a pick-up circuit for said second control relay arranged to be closed at the termination of such interval, and means controlled by said device for subsequently holding said second control relay in its energized condition.

5. Apparatus for measuring a time interval comprising a movable record receiving element, driving means for moving said element, a first electromagnetic means operating when energized to make a distinctive record on said element, a second electromagnetic means operating when energized to make a different distinctive record on said element, a first control relay for causing the energization of said first electromagnetic means, a second control relay for causing the energization of said second electromagnetic means, a manually controlled contact device, a pick-up circuit for said first control relay arranged to be closed at the beginning of said time interval, a stick circuit controlled by said contact device for subsequently holding said first control relay in its energized condition, a pick-up circuit for said second control relay arranged to be closed at the termination of such interval, and a stick circuit controlled by said contact device for subsequently holding said second control relay in its energized condition.

6. Apparatus for measuring the time interval between two events comprising, two normally de-energized relays, means for energizing the first relay upon the occurrence of the first event, means for energizing the second relay upon the occurrence of the second event, two magnets A and B, a circuit for magnet A including a back contact of said first relay, a circuit for magnet B including a front contact of the first relay and a back contact of the second relay, an auxiliary circuit for magnet A including front contacts of both relays, and recording mechanism controlled by said magnets.

7. Apparatus for measuring the time interval between two events comprising, two normally de-energized relays, means for energizing the first relay upon the occurrence of the first event, means for energizing the second relay upon the occurrence of the second event, two magnets A and B, means for energizing magnet A while the first relay is de-energized, means for energizing magnet B while the first relay is energized and the second relay is de-energized, auxiliary means for energizing magnet A when both relays are energized, and recording mechanism controlled by said magnets.

In testimony whereof I affix my signature.
JOHN WARNER LIVINGSTON.